United States Patent [19]

Deinet et al.

[11] 4,448,906
[45] May 15, 1984

[54] SURFACE-COATING COMPOSITIONS

[75] Inventors: Adolph J. Deinet, East Brunswick; William B. Woods, Lebanon, both of N.J.

[73] Assignee: Nuodex Inc., Piscataway, N.J.

[21] Appl. No.: 389,210

[22] Filed: Jun. 16, 1982

[51] Int. Cl.$^3$ .............................................. C08K 5/34
[52] U.S. Cl. ................................... 523/122; 524/104; 525/282
[58] Field of Search ...................... 523/122; 524/104; 525/282

[56] References Cited

U.S. PATENT DOCUMENTS

| | | | |
|---|---|---|---|
| 2,526,517 | 10/1950 | Tawney | 260/313 |
| 2,569,767 | 10/1951 | Knock | 525/282 |
| 2,790,787 | 4/1957 | Tawney | 526/262 |
| 3,296,155 | 1/1967 | Minsk et al. | 430/451 |
| 3,301,826 | 1/1967 | Tawney | 525/282 |
| 3,721,580 | 3/1973 | Trott et al. | 525/330.5 |
| 3,766,294 | 10/1973 | Klebe et al. | 525/282 |
| 3,789,052 | 1/1974 | Klebe et al. | 525/282 |
| 3,890,270 | 6/1975 | Minieri | 523/122 |
| 3,929,705 | 12/1975 | Minieri | 523/122 |
| 3,998,785 | 12/1976 | Stone | 523/122 |
| 4,111,879 | 9/1978 | Mori et al. | 523/122 |

FOREIGN PATENT DOCUMENTS

| | | | |
|---|---|---|---|
| 54-4942 | 1/1979 | Japan | 525/282 |
| 56-164106 | 12/1981 | Japan | 523/122 |
| 57-102966 | 6/1982 | Japan | 523/122 |

*Primary Examiner*—Joseph L. Schofer
*Assistant Examiner*—N. Sarafin
*Attorney, Agent, or Firm*—James P. Scullin

[57] ABSTRACT

Surface-coating compositions that have improved resistance to attack by bacteria, fungi, and other microorganisms contain from 0.1% to 3% by weight of a biocidal compound having the structural formula

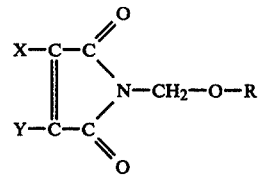

wherein R represents hydrogen or —COR'; R' represents alkyl, aryl, or aralkyl; and X and Y, which may be the same or different, represent hydrogen or chlorine.

14 Claims, No Drawings

SURFACE-COATING COMPOSITIONS

This invention relates to surface-coating compositions that have improved resistance to deterioration resulting from attack by bacteria, fungi, and other microorganisms. More particularly, it relates to surface-coating compositions that contain a biocidally-effective amount of N-hyddroxymethylmaleimide or a derivative of this compound.

It is well known that paints and varnishes often have inadequate resistance to the action of microorganisms. Some of these coating compositins, such as enamels and house paints, contain as their resinous binders drying oils, oleoresinous varnishes, or alkyd resins, which are subject to attack by fungi and bacteria. Others, for example, aqueous dispersions of water-insoluble synthetic linear polymers, generally contain as plasicizers and thickeners materials that have their origin in animal or vegetable sources and that render the compositions susceptible to mildew. The resulting deterioration of the surface-coating compositions seriously hinders their full scale utilization, particularly in those areas and in those applications that are conducive to such attack.

Various biocidal materials have been suggested for use in surface-coating compositions, but none has proven entirely satisfactory in this application. Some do not provide the required prolonged protection against attack by microorganisms, while others undergo sulfide staining and still others hydrolyze in alkaline aqueous paint systems or separate from the applied coating by migration, volatilization, or leaching after the coating has been spread in a thin layer over the surface to be protected. Some biocidal materials cause the coating compositions to gel or impart color or odor to them.

In accordance with this invention, it has been found that surface-coating compositions can be protected from attack by bacteria, fungi, and other microorganisms by incorporating in them a new class of biocides. These biocides, which are thoroughly compatible with the resinous binders that commonly are used in surface-coating compositions and which are resistant to sulfide staining, provide excellent and prolonged resistance to deterioration resulting from attack by bacteria, fungi, and other microorganisms without adversely affecting the color, pH, viscosity, and other physical properties of the surface-coating compositions.

The biocidal compounds that are used in the surface-coating compositions of this invention may be represented by the structural formula

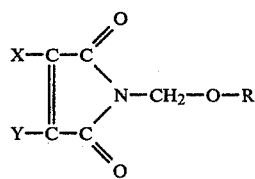

wherein R represents hydrogen or —COR'; R' represents alkyl, aryl, or aralkyl; and X and Y, which may be the same or different, represent hydrogen or chlorine.

Illustrative of these biocidal compounds are the following:
N-hydroxymethylmaleimide,
N-maleimidomethyl acetate,
N-maleimidomethyl propionate,
N-maleimidomethyl isobutyrate,
N-maleimidomethyl 2-ethylhexanoate,
N-maleimidomethyl n-octanoate,
N-maleimidomethyl decanoate,
N-maleimidomethyl dodecanoate,
N-maleimidomethyl hexadecanoate,
N-maleimidomethyl phenylacetate,
N-maleimidomethyl phenylpropionate,
N-maleimidomethyl benzoate,
N-maleimidomethyl p-hydroxybenzoate,
N-hydroxymethylchloromaleimide,
N-hydroxymethyldichloromaleimide,
N-chloromaleimidomethyl formate,
N-chloromaleimidomethyl acetate,
N-chloromaleimidomethyl hexanoate,
N-chloromaleimidomethyl dodecanoate,
N-chloromaleimidomethyl phenylacetate,
N-chloromaleimidomethyl benzoate,
N-dichloromaleimidomethyl propionate,
N-dichloromaleimidomethyl phenylpropionate,
N-dichloromaleimidomethyl p-chlorobenzoate,
and the like, and mixtures thereof.

A preferred group of the biocidal compounds have the structural formula

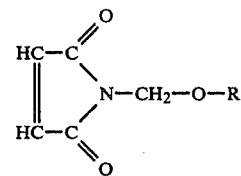

wherein R has the aforementioned significance. Examples of these compounds include
N-hydroxymethylmaleimide,
N-maleimidomethyl acetate,
N-maleimidomethyl phenylacetate, and
N-maleimidomethyl dodecanoate.

The biocidal compounds may be prepared by any suitable and convenient procedure. For example, N-hydroxymethylmaleimide may be prepared by the reaction of formaldehyde with maleimide. This procedure is described in detail in U.S. Pat. No. 2,526,517, which is incorporated herein by reference. The N-maleimidomethyl carboxylates may be prepared by the reaction of N-hydroxymethylmaleimide, N-chloromethylmaleimide, or N-bromomethylmaleimide with the appropriate carboxylic acid, acid chloride, or acid anhydride. The preparation of several of these carboxylates is disclosed in U.S. Pat. No. 2,790,787, which is incorporated herein by reference.

The biocidal compounds of this invention can be used to impart bacterial and fungal resistance to a wide variety of paints, varnishes, printing inks, and other surface-coating compositions including both water-based and organic solvent-based systems. They are particularly valuable as biocides in water-based coatings in which the resinous binder is a water-insoluble synthetic linear addition polymer.

In a preferred embodiment of the invention, the biocidal compounds are used in aqueous dispersions that contain about 10 percent to 60 percent by weight of a water-insoluble, film-forming resinous binder that is a synthetic linear addition polymer, an oleoresinous binder, or a mixture of these binders. The useful aqueous dispersions of synthetic linear addition polymers are ordinarily prepared by the emulsion polymerization of ethylenically-unsaturated monomers. Illustrative of these polymers are polyvinyl acetate; polyvinyl butyrate; polyvinyl chloride; copolymers of vinyl acetate with vinyl chloride or acrylonitrile; copolymers of vinyl chloride with vinylidene chloride, polyethylene; polyisobutylene; polystyrene; copolymers of styrene with maleic anhydride or butadiene; copolymers of acrylonitrile with butadiene; copolymers of acrylonitrile with butadiene; copolymers of methacrylic acid esters of alcohols having 1 to 8 carbon atoms with vinyl acetate, vinyl chloride, acrylonitrile, or styrene; copolymers of acrylic acid esters of alcohols having 1 to 8 carbon atoms with vinyl acetate, vinyl chloride, acrylonitrile, or styrene; and mixtures thereof. Suitable oleoresinous binders include drying oils, such as linseed oil, tung oil, soybean oil, dehydrated castor oil, safflower oil, or fish oil; bodied drying oils; blends of drying oils or bodied drying oils with a resin component such as limed rosin, an ester gum, or phenolic resin; oleoresinous varnishes formed by heating one of the aforementioned resins with one or more drying oils or bodied drying oils; alkyd resins, which are resinous products resulting from the reaction of a polyhydric alcohol, such as pentaerythritol or glycerol, with a dicarboxylic acid, such as phthalic anhydride, and fatty acids; and mixtures thereof.

In another preferred embodiment of the invention, the biocidal compounds of this invention are used as the biocidal component in organic solvent-based systems that contain an oleoresinous binder as hereinbefore defined.

Only a small concentration of the biocidal compound need be present in the surface-coating compositions of this invention. The addition of as little as 0.1 percent by weight of one or more of these biocidal compounds will bring about an appreciable improvement in the resistance of the composition to attack by fungi and bacteria. Three percent or more of the biocidal compounds can be used, but these larger amounts ordinarily do not provide further improvement in the properties of the surface-coating compositions and for this reason are not usually used. While the amount of the biocidal compound that will provide optimum protection for a surface-coating composition depends upon such factors as the choice of the biocidal compound, the choice of resinous binder and other ingredients of the composition and the amount of each of these materials that is used, and the application for which the coating composition is intended, in most cases 1 to 2 percent of the biocidal compound, based on the weight of the surface-coating composition, is used.

In addition to the resinous binder and the biocidal compound, the surface-coating compositions of this invention may contain various auxiliary materials, such as pigments, extenders, solvents, dyes, defoaming agents, driers, thickeners, emulsifiers, plasticizers, other biocides, and the like in the amounts ordinarily used for these purposes.

The biocidal compounds may be incorporated into the surface-coating compositions by any convenient procedure. For example, they can be added to a composition that contains the resinous binder, pigment component, and water or organic solvent. Alternatively, they can be combined with the pigments and other ingredients to form a pigment component that is mixed with the resinous binder and water or organic solvent to form the surface-coating composition. They can be added as such to the other components of the surface-coating composition, or they can be added as a solution in an alcohol, ether, ketone, or other solvent.

The invention is further illustrated by the following examples. In these examples, all parts are parts by weight and all percentages are percentages by weight unless otherwise stated.

EXAMPLE 1

A mixture of 125 grams of water, 26 ml. of 37% aqueous formaldehyde solution, 25 grams of maleimide, and 0.1 gram of anhydrous potassium carbonate was heated at its reflux temperature for 90 minutes, cooled to ambient temperature, and filtered. After removal of the water by heating under vacuum, there was obtained 32 grams of N-hydroxymethylmaleimide.

EXAMPLE 2

A mixture of 10 grams of N-hydroxymethylmaleimide, 10.2 grams of acetic anhydride, and 0.2 gram of concentrated sulfuric acid was allowed to stand at ambient temperature for 2 hours. The clear solution that formed was diluted with an equal volume of water to cause the product to crystallize. The product was collected, washed with water, and dried at 70° C. There was obtained 2.6 grams of N-maleimidomethyl acetate, which melted at 88°–90° C.

EXAMPLE 3

A mixture of 12.3 grams of phenacetyl chloride, 6.3 grams of pyridine, and 20 grams of acetone was cooled to control the exotherm. When the yellow pyridine salt had formed, 10 grams of N-hydroxymethylmaleimide was added, and the mixture was stirred at 40°–45° C. for 10 minutes. The clear deep red solution that formed was diluted with two volumes of water and then extracted with 100 ml. of ethyl acetate. The extract was washed with 2% HCl solution and then heated under vacuum to remove the solvent from it. There was obtained 12.1 grams of N-maleimidomethyl phenylacetate.

EXAMPLE 4

To a solution of 7.5 grams of N-hydroxymethylmaleimide in 15 grams of acetone was added 11.5 grams of n-dodecanoyl chloride and then 4.7 grams of pyridine. The reaction mixture was stirred for 10 minutes and then poured into 75 ml. of ethyl acetate. The resulting solution was washed first with 75 ml. of a 2% HCl solution and then with water. After the solvents had been removed by heating the solution under vacuum, there was obtained 10.6 grams of N-maleimidomethyl dodecanoate, which was a red-brown mobile liquid.

EXAMPLE 5

A. An acrylic latex paint was prepared by grinding the following materials together in a Cowles Dissolver:

|  | Parts |
| --- | --- |
| Water | 77.0 |
| 25% Aqueous solution of sodium salt of maleic anhydride/diisobutylene copolymer | 19.5 |
| 2,2,4-Trimethylpentane-1,3-diol monoisobutyrate | 1.5 |
| Benzyl ether of octylphenol-ethylene oxide reaction product | 2.7 |
| Defoamer | 0.9 |
| Ethylene glycol | 14.3 |
| Titanium dioxide (rutile) | 250.0 |

-continued

|  | Parts |
|---|---|
| Talc | 77.0 |
| Calcium carbonate | 144.0 |
| 2% Aqueous solution of hydroxyethylcellulose | 77.0 | and incorporating into the resulting blend the following materials:

|  | Parts |
|---|---|
| Acrylic latex (Poly-Tex 6510) | 392.5 |
| Defoamer | 0.9 |
| Water | 19.3 |
| Ammonium hydroxide | 1.8 |
| Propylene glycol | 106.0 |

The paint had the following properties as determined by standard paint testing methods:

Viscosity: 74–78 K.U.

Brookfield Viscosity (No. 3 spindle, 60 rpm): 1600 cps.

To portions of this paint were added either 2% by weight of one of the biocidal compounds of this invention or 2% by weight of a comparative biocide.

B. A polyvinyl acetate emulsion paint was prepared by mixing together the following materials:

|  | Parts |
|---|---|
| Water | 280 |
| Potassium pyrophosphate | 3 |
| Calcium metasilicate | 135 |
| Titanium dioxide (rutile) | 220 |
| 2% Aqueous solution of methylcellulose | 200 |
| Diethyl ether of diethylene glycol | 37 |
| 55% Aqueous dispersion of polyvinyl acetate | 350 |

To samples of this paint were added either 2% by weight of one of the biocidal compounds of this invention or 2% by weight of a comparative biocide.

C. An oil-based paint was prepared by mixing together the following materials:

|  | Parts |
|---|---|
| Titanium Dioxide | 225.0 |
| Talc | 400.0 |
| Long oil alkyd resin (Aroplaz 1266M-60) | 420.0 |
| Mineral spirits | 167.0 |
| Calcium drier (4% Ca) | 12.0 |
| Zinc drier (8% Zn) | 5.0 |
| Cobalt drier (6% Co) | 1.6 |

To portions of this paint were added either 2% by weight of one of the biocidal compounds of this invention or 2% by weight of a comparative biocide.

EXAMPLE 6

Samples of the acrylic latex paint, the vinyl acetate emulsion paint, and the oil-based paint whose preparation was described in Example 5 were evaluated by means of an agar diffusion assay. In this test, agar is inoculated with the test organism, the paint containing a biocidal compound is placed in a well cut in the agar, and after incubation at 28° C. and 85–95% relative humidity, the activity of the biocides is measured by the size of the zones of inhibition. The biocidal compounds tested and the results obtained are set forth in the table that follows.

In this table,

ZO=Zone of inhibited growth in mm.

0=No zone of inhibition

TR=Trace zone of inhibited growth

—=Not tested

| Bacteria A = | Mixed paint spoilage strains |
|---|---|
| B = | Pseudomonas aeruginosa |
| C = | Aerobacter aerogenes |
| Fungi D = | Aureobasidium pullulans |
| E = | Penicillium crustosum |
| F = | Aspergillus niger |
| Comparative Biocide A = | Tetrachloroisophthalonitrile (Nopcocide N-96 - Diamond Shamrock Corp.) |
| Comparative Biocide B = | Phenylmercuric dodecenyl succinate (Super Ad-it ® 95 - Tenneco Chemicals, Inc.) |
| Comparative Biocide C = | Mixture of bicyclic polyoxymethyleneoxazolidines (Nuosept ® 95 - Tenneco Chemicals, Inc.) |

TABLE

|  |  | Test Level |  | Effect on Liquid Paint |  |  | Biocidal Activity |  |  |  |  |  |
|---|---|---|---|---|---|---|---|---|---|---|---|---|
|  |  |  |  |  |  |  | Bacteria |  |  | Fungi |  |  |
| Biocide | Paint | (%) | pH | Odor | Color | Viscosity | A | B | C | D | E | F |
| Product of Ex. 1 | PVA | 2 | 5.5 | None | None | None | ZO-10 | ZO-12 | ZO-15 | ZO-10 | ZO-15 | ZO-4 |
|  | Acrylic | 2 | 6.5 | None | Off White | None | ZO-10 | ZO-10 | ZO-15 | ZO-8 | ZO-12 | ZO-2 |
|  | Oil | 2 | — | None | None | None | — | — | — | ZO-11 | ZO-12 | ZO-1 |
| Product of Ex. 2 | PVA | 2 | 5.0 | None | None | None | ZO-5 | ZO-5 | ZO-15 | ZO-5 | ZO-10 | ZO-1 |
|  | Acrylic | 2 | 6.0 | None | None | None | ZO-9 | ZO-9 | ZO-14 | ZO-2 | ZO-10 | ZO-1 |
|  | Oil | 2 | — | None | None | None | — | — | — | ZO-5 | ZO-15 | ZO-3 |
| Product of Ex. 3 | PVA | 2 | 6.0 | None | None | None | ZO-6 | ZO-5 | ZO-12 | ZO-12 | ZO-12 | ZO-5 |
|  | Acrylic | 2 | 6.6 | None | None | None | ZO-6 | ZO-10 | ZO-14 | ZO-14 | ZO-12 | ZO-6 |
|  | Oil | 2 | — | None | None | None | — | — | — | ZO-12 | ZO-12 | ZO-6 |
| Product of Ex. 4 | PVA | 2 | 6.4 | None | None | None | ZO-3 | ZO-3 | ZO-9 | ZO-3 | ZO-5 | ZO-1 |
|  | Acrylic | 2 | 6.0 | None | None | None | ZO-5 | ZO-6 | ZO-8 | ZO-7 | ZO-6 | ZO-1 |
|  | Oil | 2 | — | None | None | None | — | — | — | ZO-2 | ZO-1 | 0 |
| Comparative Examples |  |  |  |  |  |  |  |  |  |  |  |  |
| Comp. Biocide A | PVA | 2 | 7.0 | None | None | None | 0 | 0 | ZO-4 | ZO-5 | ZO-5 | ZO-2 |
|  | Acrylic | 2 | 8.0 | None | None | None | TR | 0 | ZO-5 | ZO-5 | ZO-5 | ZO-1 |
|  | Oil | 2 | — | None | None | None | — | — | — | ZO-4 | ZO-6 | ZO-1 |
| Comp. Biocide B | PVA | 2 | 6.9 | None | None | None | ZO-5 | ZO-6 | ZO-10 | ZO-19 | ZO-16 | ZO-12 |
|  | Acrylic | 2 | 7.9 | None | None | None | ZO-9 | ZO-9 | ZO-12 | ZO-20 | ZO-18 | ZO-19 |
|  | Oil | 2 | — | None | None | None | — | — | — | ZO-11 | ZO-7 | ZO-5 |
| Comp. Biocide C | PVA | 2 | 7.0 | None | None | None | ZO-10 | ZO-6 | ZO-10 | ZO-10 | ZO-13 | ZO-3 |

TABLE-continued

| Biocide | Paint | Test Level (%) | pH | Effect on Liquid Paint | | | Biocidal Activity | | | | | |
| | | | | Odor | Color | Viscosity | Bacteria | | | Fungi | | |
| | | | | | | | A | B | C | D | E | F |
| --- | --- | --- | --- | --- | --- | --- | --- | --- | --- | --- | --- | --- |
| | Acrylic | 2 | 7.3 | None | None | None | ZO-10 | ZO-5 | ZO-10 | ZO-9 | ZO-10 | ZO-2 |
| | Oil | 2 | — | None | None | None | — | — | — | — | — | — |
| None | PVA | 2 | 7.0 | None | None | None | 0 | 0 | 0 | 0 | 0 | 0 |
| | Acrylic | 2 | 8.4 | None | None | None | 0 | 0 | 0 | 0 | 0 | 0 |
| | Oil | 2 | — | None | None | None | — | — | — | 0 | 0 | 0 |

Each of the other biocidal compounds disclosed herein can be used in a similar way to protect surface-coating compositions from deterioration resulting from attack by fungi, bacteria, and other microorganisms.

What is claimed is:

1. A surface-coating composition having improved resistance to attack by bacteria, fungi, and other microorganisms that comprises
   (a) a water-insoluble resinous binder selected from the group consisting of synthetic linear addition polymers prepared by the emulsion polymerization of ethylenically-unsaturated monomers, oleoresinous binders, and mixtures thereof and
   (b) 0.1% to 3%, based on the weight of the composition, of a biocidal compound having the structural formula

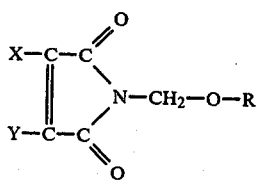

wherein R represents hydrogen or —COR'; R' represents alkyl, aryl, or aralkyl; and X and Y, which may be the same or different, represent hydrogen or chlorine.

2. A surface-coating composition as set forth in claim 1 that contains 1% to 2%, based on the weight of the composition, of said biocidal compound.

3. A surface-coating composition as set forth in claim 1 wherein the biocidal compound has the structural formula

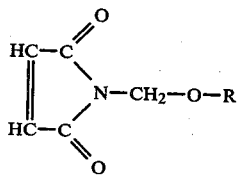

wherein R has the aforementioned significance.

4. A surface-coating composition as set forth in claim 1 wherein the biocidal compound is N-hydroxymethylmaleimide.

5. A surface-coating composition as set forth in claim 1 wherein the biocidal compound is N-maleimidomethyl acetate.

6. A surface-coating composition as set forth in claim 1 wherein the biocidal compound is N-maleimidomethyl phenylacetate.

7. A surface-coating composition as set forth in claim 1 wherein the biocidal compound is N-maleimidomethyl dodecanoate.

8. The method of controlling the growth of bacteria, fungi, and other microorganisms in a surface-coating composition that contains a water-insoluble resinous binder selected from the group consisting of synthetic linear addition polymers prepared by the emulsion polymerization of ethylenically-unsaturated monomers, oleoresinous binders, and mixtures thereof that comprises incorporating in said composition 0.1% to 3%, based on the weight of said composition, of a biocidal compound having the structural formula

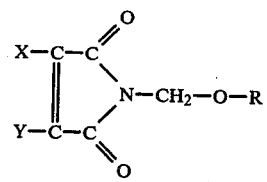

wherein R represents hydrogen or —COR'; R' represents alkyl, aryl, or aralkyl; and X and Y, which may be the same or different, represent hydrogen or chlorine.

9. The method of claim 8 wherein the biocidal compound has the structural formula

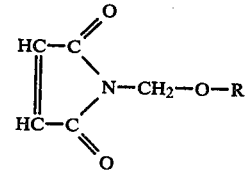

wherein R has the aforementioned significance.

10. The method of claim 8 wherein the biocidal compound is N-hydroxymethylmaleimide.

11. The method of claim 8 wherein the biocidal compound is N-maleimidomethyl acetate.

12. The method of claim 8 wherein the biocidal compound is N-maleimidomethyl phenylacetate.

13. The method of claim 8 wherein the biocidal compound is N-maleimidomethyl dodecanoate.

14. The method of claim 8 wherein from 1% to 2%, based on the weight of the composition, of the biocidal compound is incorporated in said composition.

* * * * *